US008666247B2

(12) United States Patent
Srinivasan et al.

(10) Patent No.: US 8,666,247 B2
(45) Date of Patent: Mar. 4, 2014

(54) BANDWIDTH DEFRAGMENTATION SYSTEMS AND METHODS IN OPTICAL NETWORKS

(75) Inventors: Hari Srinivasan, Haryana (IN); Waseem Reyaz Khan, New Delhi (IN); Anurag Prakash, Noida (IN); Saurabh Pandey, Haryana (IN)

(73) Assignee: Ciena Corporation, Hanover, MD (US)

( * ) Notice: Subject to any disclaimer, the term of this patent is extended or adjusted under 35 U.S.C. 154(b) by 410 days.

(21) Appl. No.: 12/945,956

(22) Filed: Nov. 15, 2010

(65) Prior Publication Data

US 2012/0051745 A1    Mar. 1, 2012

(51) Int. Cl.
*H04J 14/00* (2006.01)

(52) U.S. Cl.
USPC .............................................. 398/57; 398/43

(58) Field of Classification Search
USPC .......................................................... 398/57
See application file for complete search history.

(56) References Cited

U.S. PATENT DOCUMENTS

| 7,020,394 | B2 * | 3/2006 | Zhang et al. ..................... 398/25 |
| 7,127,167 | B2 * | 10/2006 | Sala et al. ......................... 398/72 |
| 7,296,087 | B1 * | 11/2007 | Ashwood Smith ........... 709/238 |
| 7,599,620 | B2 * | 10/2009 | Graves et al. ..................... 398/51 |
| 7,792,040 | B2 * | 9/2010 | Nair et al. ....................... 370/238 |
| 8,184,976 | B2 * | 5/2012 | Kazawa et al. .................. 398/67 |
| 2002/0075542 | A1 * | 6/2002 | Kumar et al. ................... 359/135 |
| 2002/0191250 | A1 * | 12/2002 | Graves et al. ................... 359/128 |
| 2004/0208556 | A1 * | 10/2004 | Joly et al. ......................... 398/57 |
| 2006/0036763 | A1 * | 2/2006 | Johnson et al. ................ 709/238 |
| 2006/0067243 | A1 * | 3/2006 | Bejerano et al. ............... 370/252 |
| 2006/0114818 | A1 * | 6/2006 | Canali et al. ................... 370/216 |
| 2006/0126521 | A1 * | 6/2006 | Hyndman et al. ............. 370/248 |
| 2006/0250961 | A1 * | 11/2006 | Vasseur .......................... 370/235 |
| 2007/0121507 | A1 * | 5/2007 | Manzalini et al. ............. 370/235 |
| 2007/0160061 | A1 * | 7/2007 | Vasseur et al. ............. 370/395.4 |
| 2007/0201871 | A1 * | 8/2007 | Peddanarappagari et al. .. 398/57 |
| 2008/0279551 | A1 * | 11/2008 | Gunreben et al. ............... 398/43 |
| 2010/0080558 | A1 * | 4/2010 | Kazawa et al. .................. 398/66 |
| 2010/0104292 | A1 * | 4/2010 | Na et al. ......................... 398/115 |
| 2011/0262128 | A1 * | 10/2011 | Madrahalli et al. ............... 398/2 |
| 2012/0294610 | A1 * | 11/2012 | Genthner et al. ............... 398/45 |
| 2012/0315045 | A1 * | 12/2012 | Spector .......................... 398/66 |
| 2013/0021797 | A1 * | 1/2013 | Kubo ............................. 362/235 |
| 2013/0272318 | A1 * | 10/2013 | Swinkels et al. ............... 370/468 |

* cited by examiner

*Primary Examiner* — Ken Vanderpuye
*Assistant Examiner* — Amritbir Sandhu
(74) *Attorney, Agent, or Firm* — Clements Bernard PLLC; Christopher L. Bernard; Lawrence A. Baratta, Jr.

(57) ABSTRACT

The present disclosure provides bandwidth defragmentation systems and methods in optical networks such as Optical Transport Network (OTN), Synchronous Optical Network (SONET), Synchronous Digital Hierarchy (SDH), Ethernet, and the like. In particular, the present invention includes bandwidth defragmentation algorithms that may be used within the context of a signaling and routing protocol to avoid bandwidth defragmentation. As such, the present invention defines a mechanism for computing an end to end path for a connection in a manner that avoids bandwidth fragmentation and provides for better network utilization. For example, the present invention may include a path computation based upon administrative weight and upon fragmentation costs. This may be implemented in existing signaling and routing protocols without changes to existing protocol messages used in topology discovery. Further, the present invention optimizes available bandwidth allowing a higher probability of higher bandwidth request being admitted.

20 Claims, 15 Drawing Sheets

➢ The already fragmented path is chosen for mesh path

BANDWIDTH DEFRAGMENTATION SYSTEMS AND METHODS IN OPTICAL NETWORKS

CROSS-REFERENCE TO RELATED APPLICATION

The present patent application/patent claims the benefit of priority of Indian Patent Application No. 2008/DEL/2010, filed on Aug. 25, 2010, and entitled "BANDWIDTH DEFRAGMENTATION SYSTEMS AND METHODS IN OPTICAL NETWORKS," the contents of which are incorporated in full by reference herein.

FIELD OF THE INVENTION

The present invention relates generally to optical networks. More particularly, the present invention relates to bandwidth defragmentation systems and methods in optical networks such as Optical Transport Network (OTN), Synchronous Optical Network (SONET), Synchronous Digital Hierarchy (SDH), Ethernet, and the like.

BACKGROUND OF THE INVENTION

Optical networks are deployed and provisioned with various bandwidth increments. For example, optical networks may utilize a signaling and routing protocol to set up and tear down bandwidth connections. Disadvantageously, in choosing a path between a pair of end points, connections originating from a given pair nodes in an optical network could use diverse paths there between. This may occur for a variety of reasons such as via a path selection algorithm (e.g., open shortest path first (OSPF), etc.), due to bandwidth availability, and the like. For example, the shortest path from either end point may originate and traverse across different paths in the case of a tie or other contention in the path selection algorithm. In this scenario, bandwidth is allocated across two different paths when a single common path could have satisfied the request thereby fragmenting bandwidth across the paths between the nodes. Over time, bandwidth for a new connection with a higher bandwidth requirement may not be met since the bandwidth across the paths is fragmented by smaller bandwidth connections although the combined bandwidth available across the paths is sufficient to satisfy new higher bandwidth request. Disadvantageously, conventional optical networks suffer from poor or less than optimal bandwidth utilization which leads to lesser revenue returns on investment for the service providers.

BRIEF SUMMARY OF THE INVENTION

In various exemplary embodiments, the present invention provides bandwidth defragmentation systems and methods in optical network such as OTN, SONET, SDH, Ethernet, and the like. In particular, the present invention includes bandwidth defragmentation algorithms that may be used within the context of a signaling and routing protocol to avoid bandwidth fragmentation. As such, the present invention defines a mechanism for computing an end to end path for a connection in a manner that avoids bandwidth fragmentation and provides for better network utilization. For example, the present invention may include a path computation based upon administrative weight and upon fragmentation costs. This may be implemented in existing signaling and routing protocols without changes to existing protocol messages used in topology discovery. Further, the present invention optimizes available bandwidth allowing a higher probability of higher bandwidth request being admitted. The present invention contemplates use in various optical network types including OTN, SONET, SDH, Ethernet, and the like.

In an exemplary embodiment, a network includes a plurality of nodes; a plurality of links interconnecting the plurality of nodes, wherein the plurality of links include a bandwidth hierarchy; a signaling and routing protocol operated between the plurality of nodes and configured to establish bandwidth connections over the plurality of links between the plurality of nodes; and a bandwidth defragmentation algorithm utilized within the signaling and routing protocol to optimize the bandwidth hierarchy on the plurality of links. The bandwidth defragmentation algorithm includes assigning a relative metric to each of the plurality of links based upon provisioned bandwidth in the bandwidth hierarchy. The relative metric for each of the plurality of links may be calculated and stored locally at each of the plurality of nodes based upon advertisements from the signaling and routing protocol. The bandwidth defragmentation algorithm may include selecting a path through the plurality of links and the plurality of nodes based upon the relative metric for each of the plurality of links. The bandwidth defragmentation algorithm may be utilized only if there is a tie in a path selection algorithm based upon administrative weight of the plurality of links. Optionally, the plurality of nodes and the plurality of links utilize Optical Transport Network and the bandwidth hierarchy includes any of Optical Channel Data Unit-n (n=0, 1, 2, 3, . . . ) and Optical channel Payload Virtual Containers, and wherein the relative metric is a different value for each of the bandwidth hierarchy. Alternatively, the plurality of nodes and the plurality of links utilize Synchronous Optical Network and the bandwidth hierarchy includes any of Synchronous Transport Signal—k (k=1, 3, 12, 24, 48, 192, . . . ), and wherein the relative metric is a different value for each of the bandwidth hierarchy. Also, the plurality of nodes and the plurality of links utilize Synchronous Digital Hierarchy and the bandwidth hierarchy may include any of Synchronous Transport Module level n (n=1, 4, 16, 64, 256, . . . ), and wherein the relative metric is a different value for each of the bandwidth hierarchy. The signaling and routing protocol may include any of Optical Signaling and Routing Protocol (OSRP), Automatically Switched Optical Networks—ITU-T Recommendation G.8080: Architecture for the Automatically Switched Optical Network (ASON) 2001, Generalized Multi-Protocol Label Switching Architecture (G-MPLS) IETF RFC 3945, 2004, and Private Network-Network Interface (PNNI). Each of the plurality of nodes may include a control module communicatively coupled to corresponding control modules of other of the plurality of nodes via an in-band or an out-of-band communication mechanism, and wherein the control module is configured to implement the signaling and routing protocol and the bandwidth defragmentation algorithm. The relative metric for each of the plurality of links may be dynamically calculated and stored locally at each of the plurality of nodes based upon advertisements from the signaling and routing protocol and based upon updates received via the advertisements. Optionally, the relative metric is based upon a predefined matrix for the bandwidth hierarchy, and the predefined matrix is established for Optical Transport Network, Synchronous Optical Network, and Synchronous Digital Hierarchy.

In another exemplary embodiment, a network element includes one or more line modules including ingress and egress to a plurality of links in a network; a control module communicatively coupled to the one or more line modules, wherein the control module is configured to operate a signaling and routing protocol to establish bandwidth connections via the one or more line modules over the plurality of links, and wherein the control module is configured to: maintain a fragmentation cost of all links in the network; responsive to a bandwidth request, determine a path through the network for the bandwidth request based upon a path selection algorithm; and utilize the fragmentation cost in the path selection algorithm. To maintain the fragmentation cost may include assigning a relative metric to each of the links in the network based upon provisioned bandwidth in a bandwidth hierarchy, and wherein to maintain the fragmentation cost may include dynamically maintaining the relative metric based upon advertisements from the signaling and routing protocol. The path selection algorithm may include selecting a path through the links in the network based upon administrative weight and the relative metric for each of the links in the network, and wherein the relative metric may be utilized only if there is a tie in a path selection algorithm based upon the administrative weight of the links. The relative metric may be based upon a predefined matrix for the bandwidth hierarchy, and the predefined matrix is established for Optical Transport Network, Synchronous Optical Network, and Synchronous Digital Hierarchy.

In yet another exemplary embodiment, a network operating method with bandwidth defragmentation includes operating a plurality of nodes interconnected by a plurality of links with a signaling and routing protocol; maintaining a relative metric for each of the plurality of links, wherein the relative metric defining fragmentation on each of the plurality of links based upon a bandwidth hierarchy; selecting a path for a bandwidth connection based upon parameters associated with the plurality of links including the relative metric; and updating the relative metric for each of the plurality of links based upon the selected path for the bandwidth connection. The network operating method may further include during the path selection, having two or more paths with equal weights and selecting one of the two or more paths based upon the relative metric defining fragmentation. The network operating method may further include providing advertisements through the signaling and routing protocol; and locally updating at each of the plurality of nodes the relative metric for each of the plurality of links based upon the advertisements. The network operating method may further include defining the relative metric based upon a bandwidth hierarchy for each of Optical Transport Network, Synchronous Digital Hierarchy, and Synchronous Optical Network.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present invention provides bandwidth defragmentation systems and methods in optical network such as OTN, SONET, SDH, Ethernet, and the like. In particular, the present invention includes bandwidth defragmentation algorithms that may be used within the context of a signaling and routing protocol to avoid bandwidth fragmentation. As such, the present invention defines a mechanism for computing an end to end path for a connection in a manner that avoids bandwidth fragmentation and provides for better network utilization. For example, the present invention may include a path computation based upon administrative weight and upon fragmentation costs. This may be implemented in existing signaling and routing protocols without changes to existing protocol messages used in topology discovery. Further, the present invention optimizes available bandwidth allowing a higher probability of higher bandwidth request being admitted. The present invention contemplates use in various optical network types including OTN, SONET, SDH, Ethernet, and the like.

Figure 1:
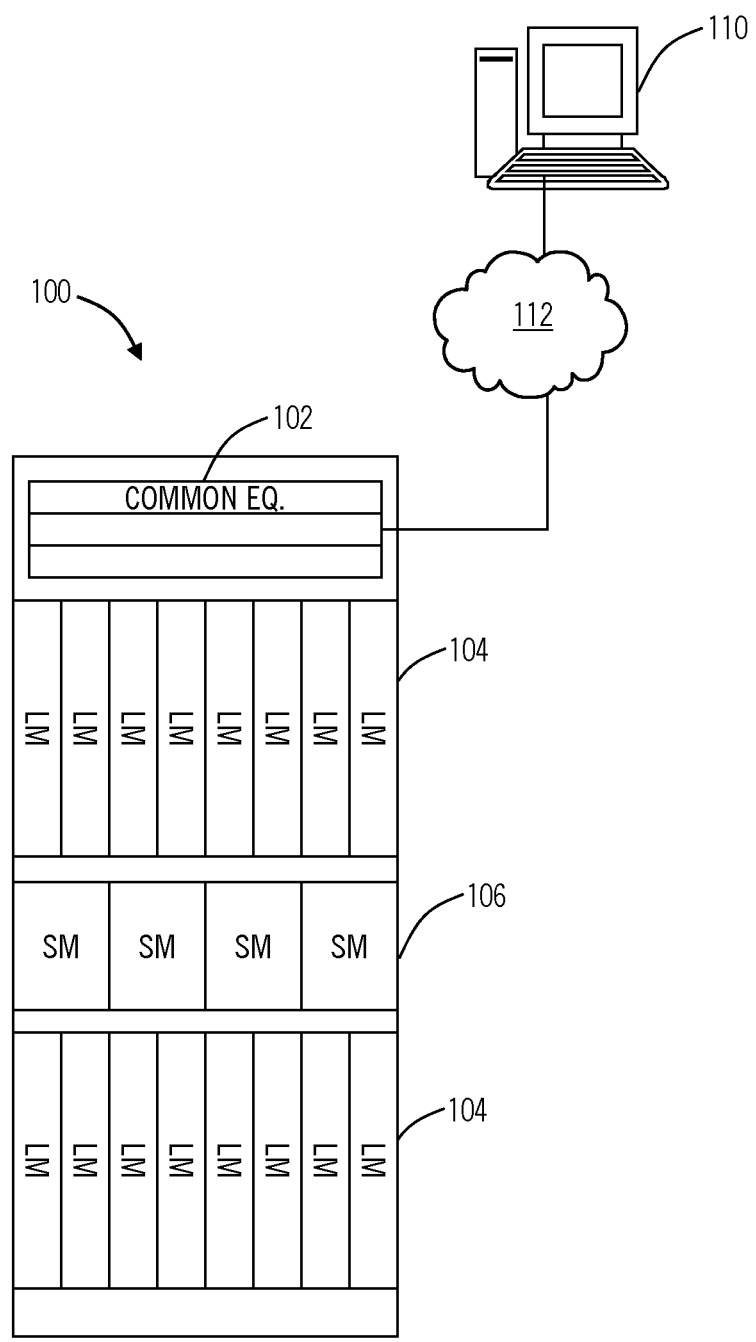
FIG. 1 is a diagram of an optical switch supporting a signaling and routing protocol and bandwidth defragmentation algorithms.

Referring to FIG. 1, in an exemplary embodiment, an optical switch 100 is illustrated supporting a signaling and routing protocol and bandwidth defragmentation algorithms. The optical switch 100 is a network element (NE) that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing layer 0, 1, and 2 consolidation. Generally, the optical switch 100 includes common equipment 102, line modules (LM) 104, and switch modules (SM) 106. The common equipment 102 may include power, a control module, operations, administration, maintenance, and provisioning (OAM&P) access, and the like. For example, the common equipment 102 may connect to a management system 110 through a data communication network 112. The management system 110 may include a network management system (NMS), element management system (EMS), or the like. Note, the management system 110 may support "Click and Go" provisioning of services utilizing the systems and methods described herein. Additionally, the common equipment 102 may include a control plane processor configured to operate a control plane and the systems and methods described herein with respect to the signaling and routing protocol.

The line modules 104 may be communicatively coupled to the switch modules 106, such as through a backplane, midplane, or the like. The line modules 104 are configured to provide ingress and egress to the switch modules 106, and are configured to provide interfaces for the various services described herein. In an exemplary embodiment, the line modules 104 may form ingress and egress switches with the switch modules as center stage switches for a three-stage switch, e.g. three stage Clos switch. The line modules 104 may include optical transceivers, such as, for example, 2.5 Gb/s (OC-48/STM-1, OTU1, ODU1), 10 Gb/s (OC-192/STM-64, OTU2, ODU2, 10 GbE), 40 Gb/s (OC-768/STM-256, OTU3, ODU4, 40 GbE), 100 Gb/s, etc. Further, the line modules 104 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 104 may include dense wave division multiplexed (DWDM) interfaces, short reach interfaces, and the like, and may connect to other line modules 104 on remote optical switches 100, NEs, end clients, and the like. From a logical perspective, the line modules 104 provide ingress and egress ports to the optical switch 100, and each line module 104 may include one or more physical ports. Further, the switch 100 may include software and the like to track logical objects associated with the line modules 104.

The switch modules 106 are configured to switch services between the line modules 104. For example, the switch modules 106 may provide wavelength granularity; SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; and the like. Specifically, the switch modules 106 may include both Time Division Multiplexed (TDM) and packet switching engines. The switch modules 106 may include redundancy as well, such as 1:1, 1:N, etc. In an exemplary embodiment of the present invention, the switch modules 106 may be configured to provide OTN layer switching. Collectively, the line modules 104 and the switch modules 106 may provide OTN services with mesh restoration.

It should be understood that FIG. 1 is a simplified representation of the optical switch 100 for illustration purposes. The present invention contemplates any number of interconnected optical switches 100 forming an optical network. The topology and configuration of the optical network may vary to suit the needs of the particular application, and FIG. 1 is not intended to limit the application or scope of the subject matter in any way. Further, it should be appreciated that FIG. 1 depicts the optical switch 100 in an oversimplified manner, and a practical embodiment may include additional components and suitably configured processing logic to support known or conventional operating features that are not described in detail herein. Also, the configuration of the optical switch 100 is provided as an exemplary illustration and the present invention contemplates other configurations besides common equipment 102, line modules 104, and switch modules 106. For example, the present invention contemplates any type of optical switch 100 including a Clos switch, a crossbar switch, a minimal spanning switch, a distributive switch, a Microelectromechanical systems (MEMS) switch, and the like.

Figure 2:
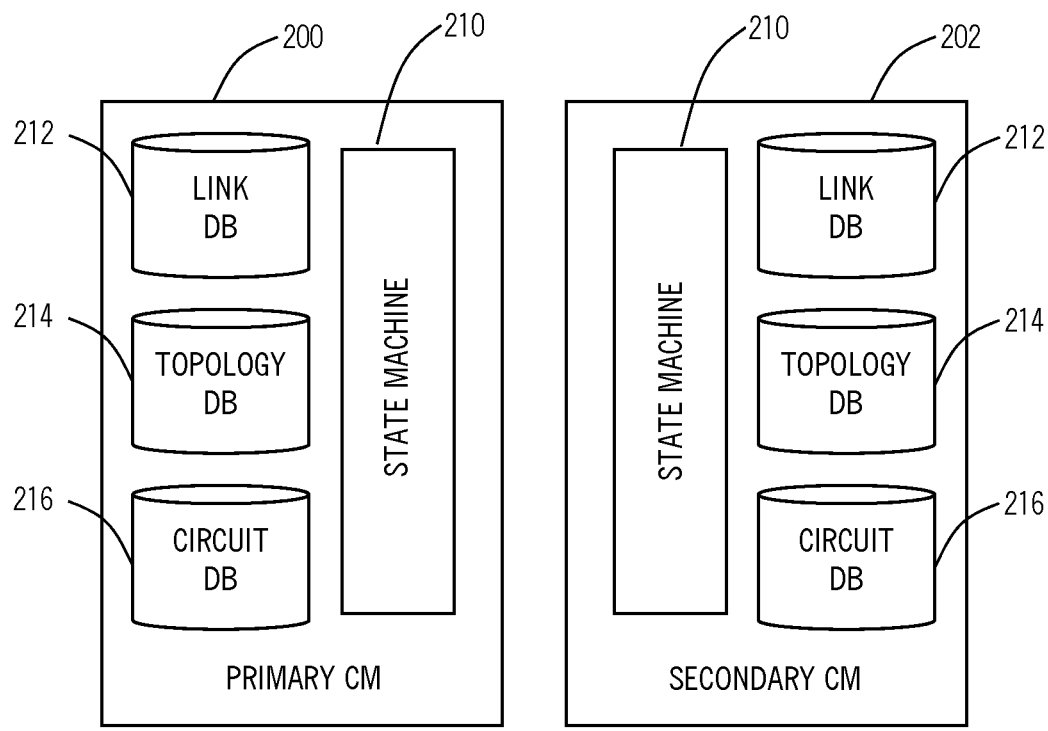
FIG. 2 is a diagram of redundant control modules (CMs) for the optical switch of FIG. 1 to provide control plane processing using a signaling and routing protocol.

Referring to FIG. 2, in an exemplary embodiment, redundant control modules (CMs) 200, 202 for the optical switch 100 are illustrated to provide control plane processing using a signaling and routing protocol. For example, the control plane may utilize signaling and routing protocols such as Optical Signaling and Routing Protocol (OSRP), Automatically Switched Optical Networks—ITU-T Recommendation G.8080: Architecture for the Automatically Switched Optical Network (ASON) 2001, Generalized Multi-Protocol Label Switching Architecture (G-MPLS) IETF RFC 3945, 2004, Private Network-Network Interface (PNNI), and the like. The CMs 200, 202 may be part of common equipment, such as common equipment 102 in the optical switch of FIG. 1. The CMs 200, 202 may include a processor which is hardware device for executing software instructions and associated memory. The processor may be any custom made or commercially available processor, a central processing unit (CPU), an auxiliary processor among several processors associated with the CMs 200, 202, a semiconductor-based microprocessor (in the form of a microchip or chip set), or generally any device for executing software instructions. When the CM 200, 202 is in operation, the processor is configured to execute software stored within memory, to communicate data to and from the memory, and to generally control operations of the CM 200, 202 pursuant to the software instructions.

The CMs 200, 202 may also include network interfaces, a data store, memory, and the like. The network interfaces may be used to enable the CMs 200, 202 to communicate on a network, such as to communicate control plane information to other CMs 200, 202. The network interfaces may include, for example, an Ethernet card (e.g., 10BaseT, Fast Ethernet, Gigabit Ethernet) or a wireless local area network (WLAN) card (e.g., 802.11a/b/g). The network interfaces may include address, control, and/or data connections to enable appropriate communications on the network. The data store may be used to store data, such as control plane information received from NEs, other CMs, etc. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but may be accessed by the processor.

Each of the CMs 200, 202 include a state machine 210, a link database (DB) 212, a topology DB 214, and a circuit DB 216. The CMs 200, 202 are responsible for all control plane processing. For example, the control plane may include OSRP, ASON, G-MPLS, or the like. In describing the exemplary embodiments herein, reference may be made to OSRP paths, links, legs, and lines. OSRP is a distributed protocol designed for controlling a network of optical switches 100, cross-connects (OXCs), or the like. OSRP introduces intelligence in the control plane of an optical transport system. It may perform many functions such as automatic resource discovery, distributing network resource information, establishing and restoring connections dynamically across the network, and the like. However, the present invention is not limited to OSRP. Those skilled in the art will recognize that other intelligent signaling and routing protocols that may (or may be modified to) provide similar functionality as OSRP (e.g., automatically establishing and restoring connections across the network, and the like) are within the scope of embodiments of the invention. For further background information, some of the routing and signal functions of OSRP are disclosed in commonly owned patents including U.S. Pat. No. 7,009,934, Mar. 7, 2006, entitled "METHOD AND APPARATUS FOR REROUTING AN OPTICAL NETWORK UPON FAULT", which is hereby fully incorporated herein by reference, and U.S. Pat. No. 6,859,431, Feb. 22, 2005, entitled "SYSTEM AND METHOD FOR CALCULATING PROTECTION ROUTES IN A NETWORK PRIOR TO FAILURE", which is hereby fully incorporated herein by reference.

The CMs 200, 202 may be configured in a redundant 1+1, 1:1, etc. configuration. The state machine 210 is configured to implement the behaviors described herein with regard to path selection. The DBs 212, 214, 216 may be stored in the memory and/or data store. The link DB 212 includes updated information related to each link in a network. The topology DB 214 includes updated information related to the network topology, and the circuit DB 216 includes a listing of terminating circuits and transiting circuits at a network element (e.g., optical switch 100) where the CMs 200, 202 are located. The CMs 200, 202 may utilize control plane mechanisms to maintain the DBs 212, 214, 216. For example, a HELLO protocol can be used to discover and verify neighboring ports, nodes, protection bundles, and the like for topology discovery. Also, the DBs 212, 214, 216 may share topology state messages to exchange information to maintain identical data. Collectively, the state machine 210 and the DBs 212, 214, 216 may be utilized to advertise topology information, capacity availability, create and manage trail termination points, and provide connection management (provisioning and restoration). For example, each link in a network may have various attributes associated with it such as, for example, line protection, available capacity, total capacity, administrative weight, protection bundle identification, delay, and the like. The state machine 210 and the DBs 212, 214, 216 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints and subject to the bandwidth defragmentation algorithms described herein. As is described herein, the CMs 200, 202 may provide a routing subsystem through the state machine 210 and the DBs 212, 214, 216.

Further, the CMs 200, 202 are configured to communicate to other CMs 200, 202 in other nodes on the network. This communication may be either in-band or out-of-band. For SONET networks, the CMs 200, 202 may use standard or extended SONET line overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 "Interfaces for the optical transport network (OTN)" G.709 are in-band side channel used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Figure 3:
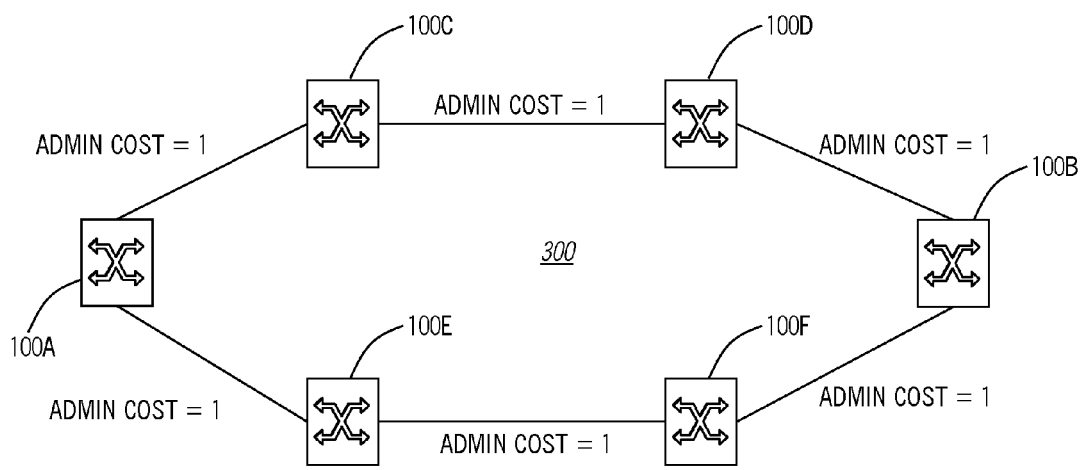
FIG. 3 is a network diagram of an optical network with a plurality of optical switches using a convention path selection algorithm.

Referring to FIG. 3, in an exemplary embodiment, an optical network 300 of a plurality of optical switches 100A-100F illustrates a convention path selection algorithm. Specifically, the optical network 300 includes a plurality of links interconnecting the plurality of optical switches 100A-100F and with each of the plurality of links having an administrative cost of one. In general, administrative cost (also referred to as administrative weight) is a routing metric that defines a cost of a particular link or path. Note, the administrative cost may be manually or automatically defined based of a plurality of parameters such as total link bandwidth, available link bandwidth, link length, delay, and the like. The administrative cost for a path may be simply the sum of the individual administrative costs of the links on the path. For example, assume the optical network 300 includes an OTN or SONET network with a plurality of data connections between the optical switch 100A and the optical switch 100B, i.e. source and destination end points. In the optical network 300, these data connections may traverse different paths for similar or different size requests originating from either end. For example, connections between the optical switches 100A, 100B may traverse the optical switches 100C, 100D or the optical switches 100E, 100F.

An algorithm may be used to determine an optimal route to the destination called the Shortest Path First. The cumulative cost of all links along the different paths is compared and the least among them is used. The cost of a path depends on parameters like administrative weight, latency, etc. of the link which is determined based upon user preferences. In case of a tie between paths, a proprietary algorithm may used to select one of the paths such as, for example, an originating port ID with the least numerical value among the port IDs of different paths may be used to break the tie. For example, the shortest path from either end point (i.e., optical switches 100A, 100B) may originate and traverse across different paths in the case of tie (e.g., at the optical switch 100A either the link to the optical switch 100C or the link to the optical switch 100E). In this scenario bandwidth will be allocated across two different paths when a single common path could have satisfied the request. Thus, bandwidth is fragmented across the paths between the optical switches 100A, 100B. Over a period of time bandwidth for a new connection with a higher bandwidth requirement may not be met since the bandwidth across the paths is fragmented by smaller bandwidth connections although the combined bandwidth available across the paths is sufficient to satisfy new higher bandwidth request.

Figure 4:
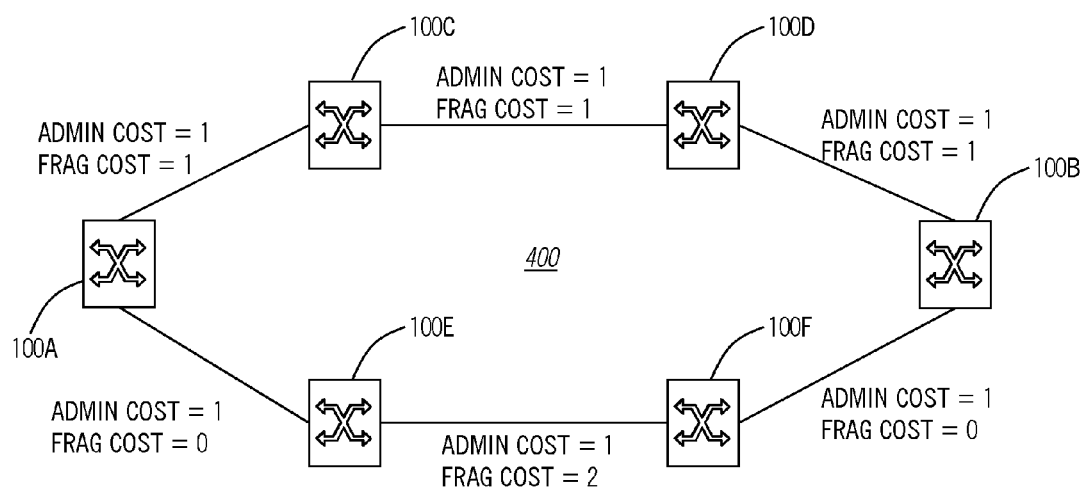
FIG. 4 is a network diagram of an optical network with a plurality of optical switches using a path selection algorithm configured with bandwidth defragmentation.

Referring to FIG. 4, in an exemplary embodiment, an optical network 400 of a plurality of optical switches 100A-100F illustrates a path selection algorithm configured with bandwidth defragmentation. The optical network 400 is similar to the optical network 300 but further includes an additional parameter referred to herein as fragmentation cost that enables optimization of the bandwidth utilization by avoiding bandwidth fragmentation in the optical network 400. The fragmentation cost may be defined as the new cumulative cost that is weighted on a per link basis along the paths. The fragmentation cost is a numerical value that quantifies the level of fragmentation on a particular link. A link is fragmented when it has any bandwidth occupied by connections. In an exemplary embodiment, the objective is to select an end to end path that is least in cumulative administrative cost, has the highest cumulative fragmentation cost, and also satisfies the bandwidth requested. The fragmentation cost factor may come into play only on a tie between multiple paths between a pair of source and destination end points. In case of a tie, the path that has the highest fragmentation cost (cumulative of fragmentation cost of all links along the path) may be chosen. This approach packs the bandwidth into one path as much as possible before taking up other paths between two given end points in the network, thus better utilizing the network bandwidth.

Fragmentation cost of a link is deduced locally at each of the optical switches 100 based on available bandwidth advertised on that link as part of the routing database exchange protocol used in the network 400. For example, the fragmentation cost may be computed, deduced, etc. through the common equipment 102 and/or the CMs 200, 202. The numerical values for the fragmentation cost may be assigned using a range of values agreed upon by the optical switches 100 in the network 400. This agreement may be done implicitly in the implementation, instead of being exchanged as part of the routing protocol. Further, the fragmentation cost for each link may be advertised between the optical switches 100 using various topology discovery and advertisement mechanisms.

In an exemplary embodiment, in OTN networks using PNNI as the routing protocol as well as other routing protocols, available bandwidth is advertised following a well published and agreed upon hierarchy between the optical switches 100. For example and specifically to OTN, the hierarchy may be standardized as ODU2, ODU1, and OPVC. Of course, in the future, bandwidth may be standardized on new OTN formats, e.g. ODU3, ODU4, etc. In an exemplary implementation, bandwidth availability may be advertised as a triplet (x, y, z) where x is a number of free ODU2 slots under an OTU2 TTP, y is number of free ODU1 slots under an ODU2 TTP, and z is number of free OPVC slots under an ODU1 TTP on that link. For example, available bandwidth for an empty OTU2 line may be advertised as (1, 4, 16), for an OTU2 link with a single ODU2 slot occupied the bandwidth is advertised as (0, 4, 16), etc. Note that with OTN and standardized bandwidths of ODU2, ODU1, and OPVC, there is a three level hierarchy in bandwidth. The present invention contemplates more or less levels in the bandwidth. With the three levels in the exemplary hierarchy—ODU2, ODU1 and OPVC, one may defined three fragmentation cost levels—ODU2_FRAGMENTED, ODU1_FRAGMENTED and OPVC_FRAGMENTED with the following values.

| Fragmentation cost level | Fragmentation cost value |
| --- | --- |
| FULL_OCCUPIED | 0 (cannot have any connections) |
| ODU2_FRAGMENTED | 0 (can have only ODU2 connections or below) |
| ODU1_FRAGMENTED | 1 (can have only ODU1 connections or below) |
| OPVC_FRAGMENTED | 2 (can have only OPVC connections or below) |

An empty OTU2 line may deduce or calculate a fragmentation cost of ODU2_FRAGMENTED for its link. For an OTU2 link with a single ODU2 slot occupied, the fragmentation cost may be deduced or calculated as ODU1_FRAGMENTED and so on. A fully occupied link may have the same fragmentation cost as the ODU2 fragmented link (largest granularity level in hierarchy). The fully occupied link never qualifies for new bandwidth, and as such does not take part in a path calculation.

On receipt of routing packets that contain available link bandwidth information from the neighbor optical switches 100 or those of remote optical switches 100 passed on by neighbor optical switches 100, the fragmentation cost of that advertised link may be calculated as stated above in the table in the case of OTN. This fragmentation cost of each link may be stored in a corresponding link object locally and used while calculating cost of end to end path along with administrative cost. For example, the fragmentation cost of each link may be stored in the common equipment 102 and/or the CMs 200, 202. In the example above, there are only three granularity levels in OTN hierarchy, ODU2, ODU1 and OPVC, so there are equivalently only three different fragmentation cost levels. More levels may be added in the hierarchy, e.g., ODU0/ODU3 and/or ODU4, with the fragmented cost levels described in the preceding table expanded as well to have ODU0_FRAGMENTED, ODU3_FRAGMENTED and/or ODU4_FRAGMENTED. For example, in the case of an OTU3 line as well along with above OTU2 and OTU1 lines, the advertised bandwidth changes to (a, b, c, d) where a—number of ODU3 slots (1), b—number of ODU2 slots (4), c—number of ODU1 slots per ODU2 (4) and d—number of OPVC slots under a ODU1(16). Here, an empty OTU3 line would have a fragmentation cost of 0, an OTU3 line with one ODU3 timeslot occupied will have a fragmentation cost of 1, an OTU3 line with one ODU3 and four ODU2 timeslots (where ODU3 has four ODU2 timeslots) occupied will have a fragmentation cost of 2 and so on. The following table lists exemplary fragmentation cost levels and values for an OTU3 line.

| Fragmentation cost level | Fragmentation cost value |
| --- | --- |
| FULL_OCCUPIED | 0 (cannot have any connections) |
| ODU3_FRAGMENTED | 0 (can have only ODU3 connections or below) |
| ODU2_FRAGMENTED | 1 (can have only ODU2 connections or below) |
| ODU1_FRAGMENTED | 2 (can have only ODU1 connections or below) |
| OPVC_FRAGMENTED | 3 (can have only OPVC connections or below) |

Those of ordinary skill in the art will recognize that the fragmentation cost values need not be restricted to the aforementioned set of values. Based on the routing protocol and the network technology used new user defined values of fragmentation cost may be derived and used. As illustrated herein, the fragmentation cost levels correlate to available bandwidth levels in the hierarchy and the corresponding fragmentation cost values provide a metric to define the fragmentation cost levels.

As described herein, the aforementioned fragmentation cost may be utilized by the optical switches 100 and a corresponding signaling and routing protocol in path selection. This may be utilized to break ties between paths in the path selection algorithm. For example, there are two paths between the optical switches 100A, 100B in FIG. 4, i.e. a first path using the optical switches 100C, 100D, and a second path using the optical switches 100E, 100F. These two paths have identical total administrative costs, i.e. Σcost(path between optical switches 100C, 100D)=Σcost(path between optical switches 100E, 100F). In the present invention, the path selection between these two paths would be decided based upon the fragmentation cost values (as illustrated, for example, in FIG. 4). Here, the path selection algorithm compares the sum of the link fragmentation costs for the paths. In this example, each of the links on the path between the optical switches 100A, 100C, 100D, 100B includes a fragmentation cost value of 1, and the links on the path between the optical switches 100A, 100E, 100F, 100D have values of 0, 2, 0, respectively. Here, the sum of the fragmentation costs on the first path is 3 versus a sum of 2 on the second path, i.e., Σfragmentation_cost (path between optical switches 100C, 100D)>Σfragmentation_cost (path between optical switches 100E, 100F), so the path between the optical switches 100C, 100D is the preferred route. Also, if the total administrative cost and fragmentation is the same between tied paths, then the preferred route may be based on some other criteria (e.g., the least Link ID at the originating node) as this does not affect bandwidth utilization since both routes would have the same fragmentation.

In addition to OTN, the present invention contemplates use with any other protocol with a distinct bandwidth hierarchy such as SONET, SDH, etc. For SONET networks, a similar hierarchy may be established based on synchronous transport signals (STS-k), i.e., STS-192, STS-48, STS-24, STS-12, STS-3 and STS-1 bandwidth chucks. For SDH, a similar hierarchy may be established based on synchronous transport module level n (STM-n), i.e. STM-256, STM-64, STM-16, STM-4, and STM-1 bandwidth chunks. Also, links which have standard concatenation enabled for a concatenation of 'x' (e.g., STS-3c) may allow only connections with 'x' concatenation size, there is no question of link getting fragmented. Links without concatenation enabled may allow any connection of any size (concatenated/non-concatenated) with bandwidth requirement being less than the available bandwidth of link. For SONET links, there may be multiple levels of fragmentation along paths. Most common SONET connection sizes in the network are STS-192, STS-48, STS-12, STS-3 and STS-1. So, in an exemplary embodiment, a set of fragmentation cost levels for SONET may include the following.

| Fragmentation cost level | Fragmentation cost value |
| --- | --- |
| FULL_OCCUPIED | 0 |
| FRAGMENTATION_LEVEL_STS192 | 0 |
| FRAGMENTATION_LEVEL_STS48 | 1 |
| FRAGMENTATION_LEVEL_STS12 | 2 |
| FRAGMENTATION_LEVEL_STS3 | 3 |
| FRAGMENTATION_LEVEL_STS1 | 4 |

Similar to the OTN example discussed herein, the available bandwidth per link may be advertised through the routing protocol. Based on the advertised bandwidth the fragmentation cost is calculated as follows.

| Available Bandwidth (X = Number of STS1s) | Fragmentation cost |
| --- | --- |
| 192 | FRAGMENTATION_LEVEL_STS192 |
| 48 <= X < 192 | FRAGMENTATION_LEVEL_STS48 |
| 12 <= X < 48 | FRAGMENTATION_LEVEL_STS12 |
| 3 <= X < 12 | FRAGMENTATION_LEVEL_STS3 |
| 1 <= X < 3 | FRAGMENTATION_LEVEL_STS1 |

Figure 5:
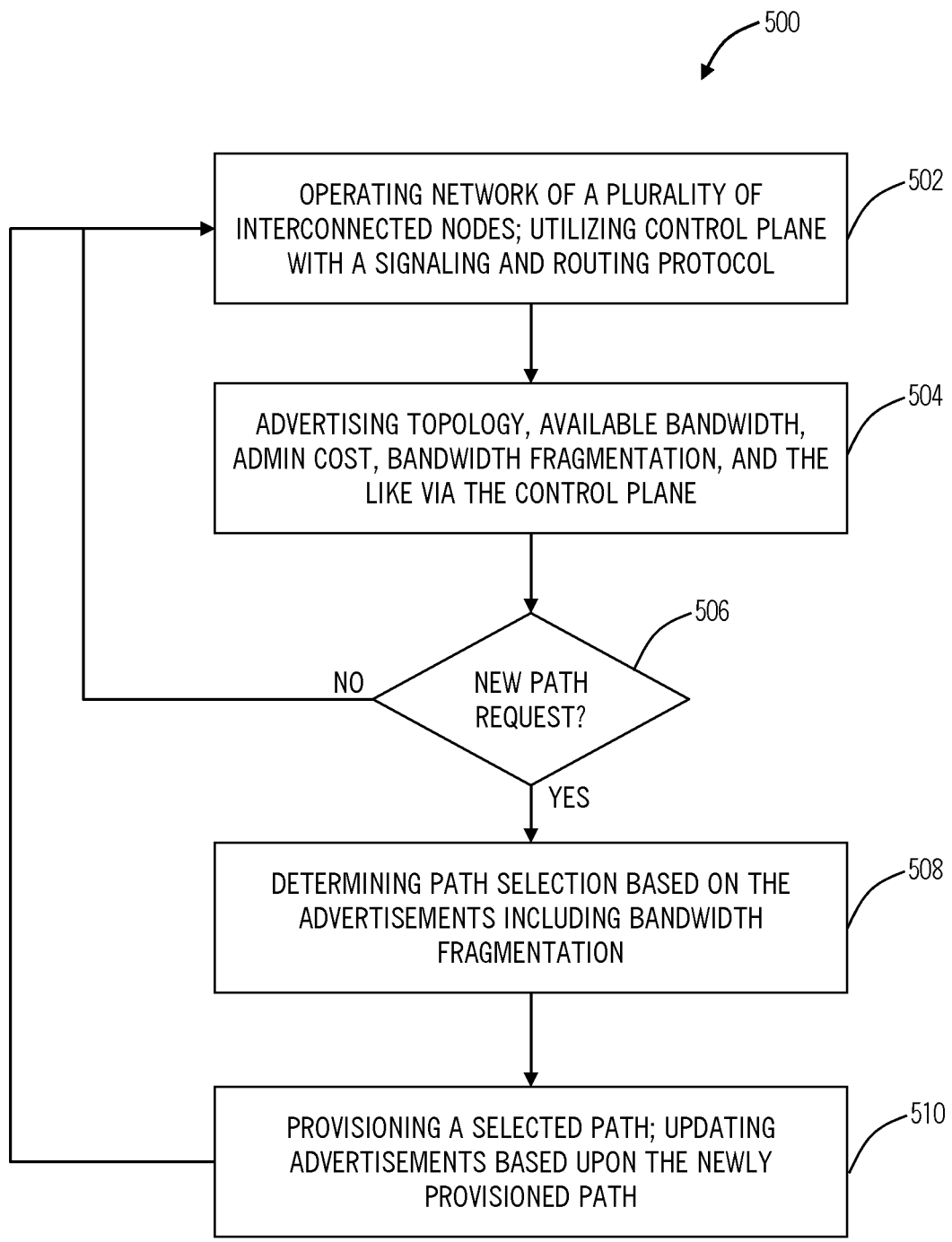
FIG. 5 is a flowchart of a network operating method utilizing bandwidth defragmentation considerations in path selection.

Referring to FIG. 5, in an exemplary embodiment, a flowchart illustrates a network operating method 500 utilizing bandwidth defragmentation considerations in path selection. The network operating method 500 may be implemented on the optical switches 100 and the various optical networks 300, 400 described herein. Also, the network operating method 500 may be utilized within any network that includes a plurality of interconnected nodes or network elements utilizing a signaling and routing protocol to automatically select paths through the network. The network operating method 500 includes operating a network of a plurality of interconnected nodes and utilizing a control plane with a signaling and routing protocol for operating the network (step 502). As discussed herein, exemplary signaling and routing protocols may include OSRP, ASON, G-MPLS, PNNI, etc. The signaling and routing protocols are utilized for path selection and the like. Specifically, the network operating method 500 may include advertising topology, available bandwidth, administrative cost or weight of links, bandwidth fragmentation cost of links, and the like via the control plane through the signaling and routing protocols (step 504). The bandwidth fragmentation cost of links may be calculated or deduced as described herein with respect to OTN, SONET, and SDH. In general, the bandwidth fragmentation cost describes numerically how fragmented each link is with respect to a bandwidth hierarchy.

The network operating method 500 may receive a new path request (step 506). Note, while the network operating method 500 is operating, new paths through the network may be required for a variety of reasons including newly requested bandwidth, protection switching due to faults or failures, and the like. The network operating method 500 determines path selection based on the advertisements including the bandwidth fragmentation costs of various links in the network (step 508). In general, the path selection may be computed at an ingress or requesting node in the network. This node should have the latest advertisements for all of the links and nodes in the network. The bandwidth fragmentation costs may be included in the path selection algorithm to ensure that paths are selected through the network to minimize bandwidth fragmentation. Specifically, the path selection algorithm may utilize the administrative cost or weight of links, the available bandwidth, the advertised topology, and the bandwidth fragmentation cost of links to determine a path. Once the path is selected, the selected path is provisioned and updated advertisements are sent through the control plane based upon the newly provisioned path (step 510).

Figure 6:
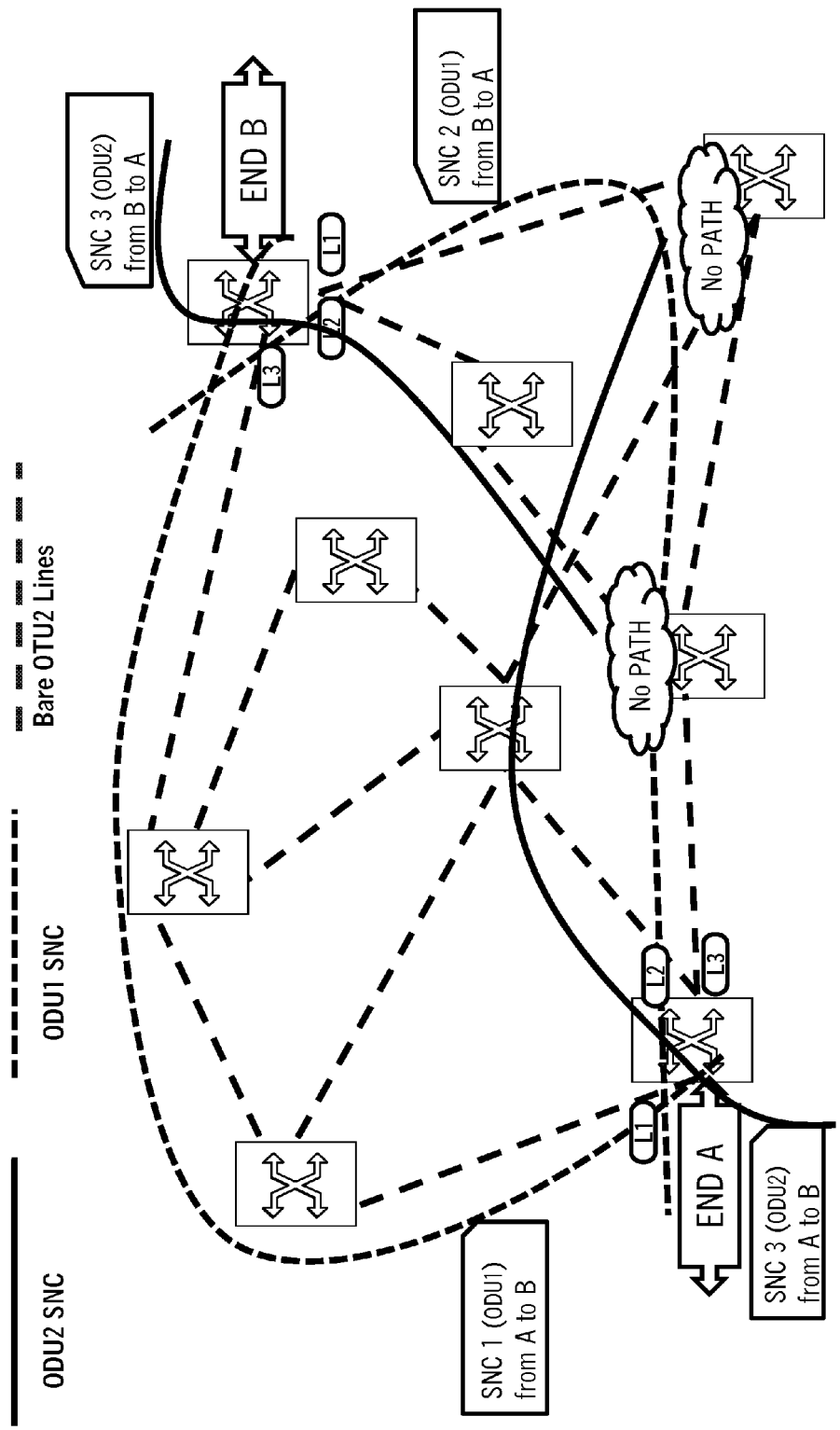
FIGS. 6-16 are various network diagrams of examples of path selection in an optical network with and without defragmentation considerations.
Figure 7:
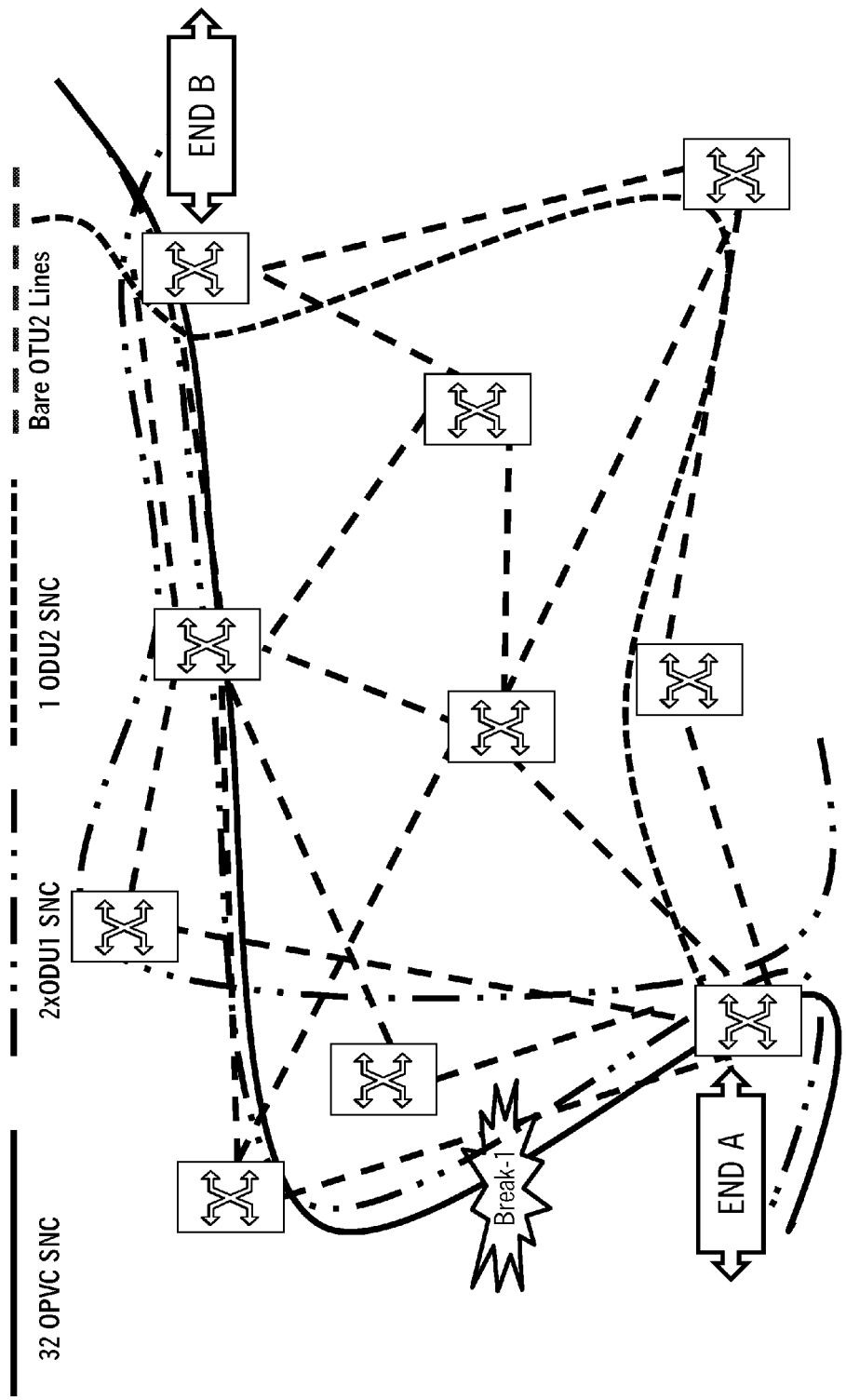
Figure 8:
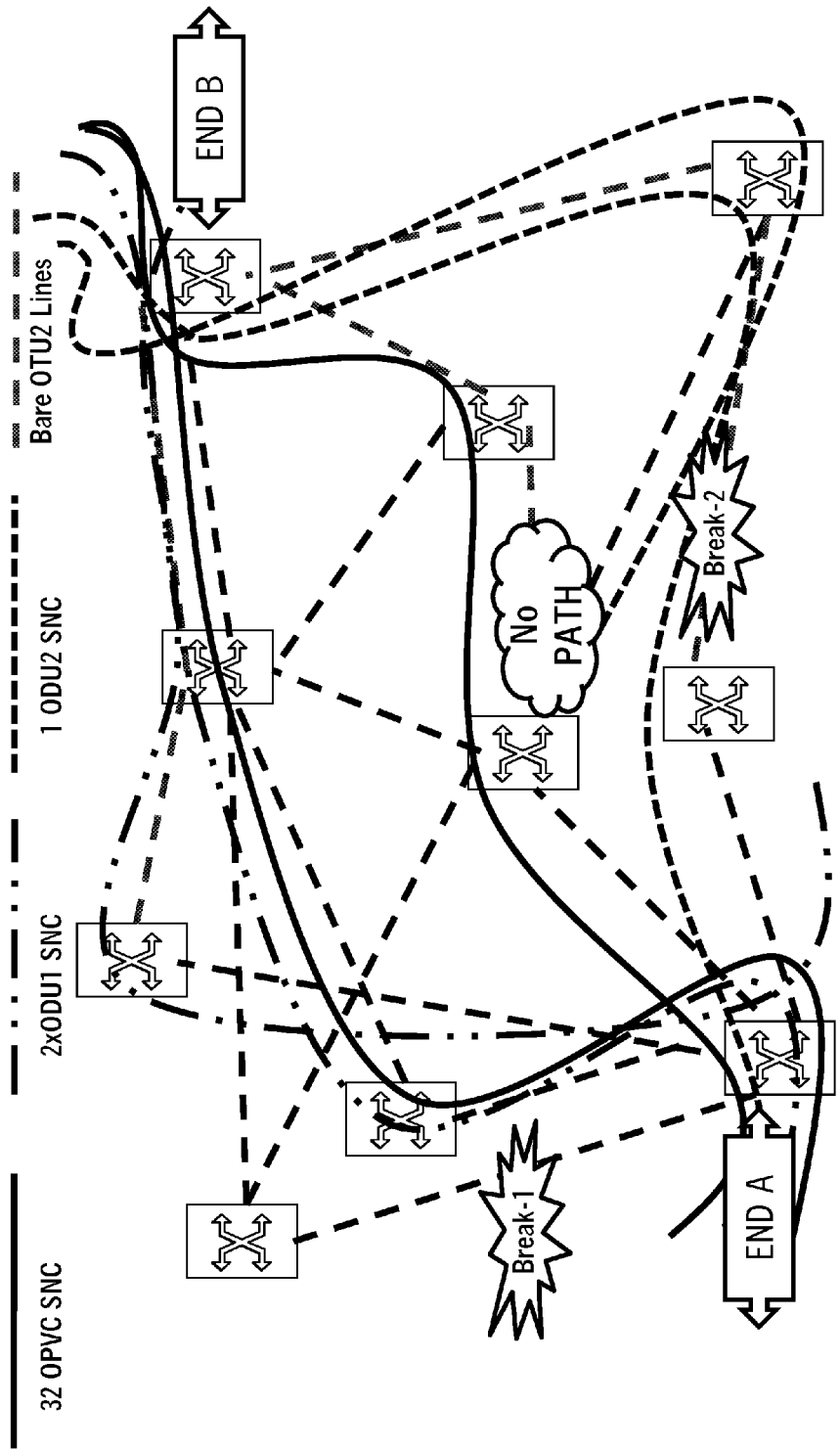

Referring to FIGS. 6-16, in various exemplary embodiments, network diagrams illustrate examples path selection in an optical network with and without defragmentation considerations. Specifically, the foregoing examples in FIGS. 6-16 include a plurality of optical switches 100 utilizing OTN with OTU2 line rates applying the defragmentation concepts described herein with ODU2/ODU1/OPVC subnetwork connections (SNCs). SNCs are flexible network connections that are set up and released using management or control plane procedures. Further, in the foregoing examples in FIGS. 6-16, each of the links is assumed to have identical administrative weights for sake of illustration. FIGS. 6-8 illustrate convention approaches without consideration bandwidth defragmentation costs and FIGS. 9-16 illustrate the present invention with consideration of bandwidth defragmentation costs.

FIG. 6 illustrates a bottleneck without considering bandwidth defragmentation where new connections are created. Specifically, in FIG. 6 and all of the remaining examples, the administrative weight is given the first preference in path selection. In the case of a tie, the tie breaker in this example is the lowest link ID number and note that ties occur due to the identical administrative weight. In FIG. 6, the network creates two ODU1 SNCs and one ODU2 SNC in that order between ends A, B. Here, SNC 1 (ODU1) is routed on one path from ends A, B and on a different path for SNC 2 (ODU1) from ends B, A. For the SNC 3 (ODU2) there is no end to end path available since the bandwidth has been fragmented by SNCs 1 & 2.

FIGS. 7 and 8 illustrate another example without considering bandwidth defragmentation where new connections are created. Here in FIGS. 7 and 8, the tie breaker in this example is a randomization while calculating the protect path on a mesh restoration. In FIG. 7, assume the current network configuration of connections is 2xODU1, 32xOPVC, and 1xODU1 between ends A, B and a fiber cut denoted as Break-1 affecting the connections. FIG. 8 illustrates restoration paths due to the Break-1 fiber cut. Specifically, due to the randomized protect path selection, SNCs will be meshed to different paths leaving the ODU2 with no protect path.

FIGS. 9-16 illustrate corresponding examples with bandwidth defragmentation considered in path selection. Specifically, in the foregoing examples, there are three granularity levels, ODU2, ODU1, and OPVC, in the OTN hierarchy and thus three corresponding fragmentation levels for costs of 0, 1, and 2. The following table includes an exemplary fragmentation cost calculation matrix used in FIGS. 9-16.

| S. No | Line Type | Advertised BW | Fragmentation Cost |
|---|---|---|---|
| 1 | OTU2 | 0 × ODU2<br>0 × ODU1<br>0 × OPVC1 | FULL_OCCUPIED |
| 2 | OTU2 | 1 × ODU2<br>4 × ODU1<br>16 × OPVC1 | ODU2_FRAGMENTED |
| 3 | OTU2 | 0 × ODU2<br>(1-4) × ODU1<br>16 × OPVC1 | ODU1_FRAGMENTED |
| 4 | OTU2 | 0 × ODU2<br>0 × ODU1<br>(1-16) × OPVC1 | OPVC_FRAGMENTED |
| 5 | OTU1 | 0 × ODU1<br>0 × OPVC1 | FULL_OCCUPIED |
| 6 | OTU1 | 1 × ODU1<br>16 × OPVC1 | ODU1_FRAGMENTED |
| 7 | OTU1 | 0 × ODU1<br>1-16 OPVC1 | OPVC_FRAGMENTED |

The fragmentation cost, denoted as F in FIGS. 9-16, is calculated based on the link bandwidth distribution based on the above matrix. In tie breaking situations, a path with the highest cumulative fragmentation cost is preferred. This information as described herein is maintained by each node locally, and does not need to be flooded or advertised to the network (however, it may be). Further, the fragmentation cost may be easily and quickly recomputed dynamically whenever bandwidth is updated. Note, unfragmented and fully fragmented links are arbitrarily given the same fragmentation cost of zero because fully exhausted links will not qualify for the path select so will not cause conflict with unfragmented links in the path calculations.

Figure 9:
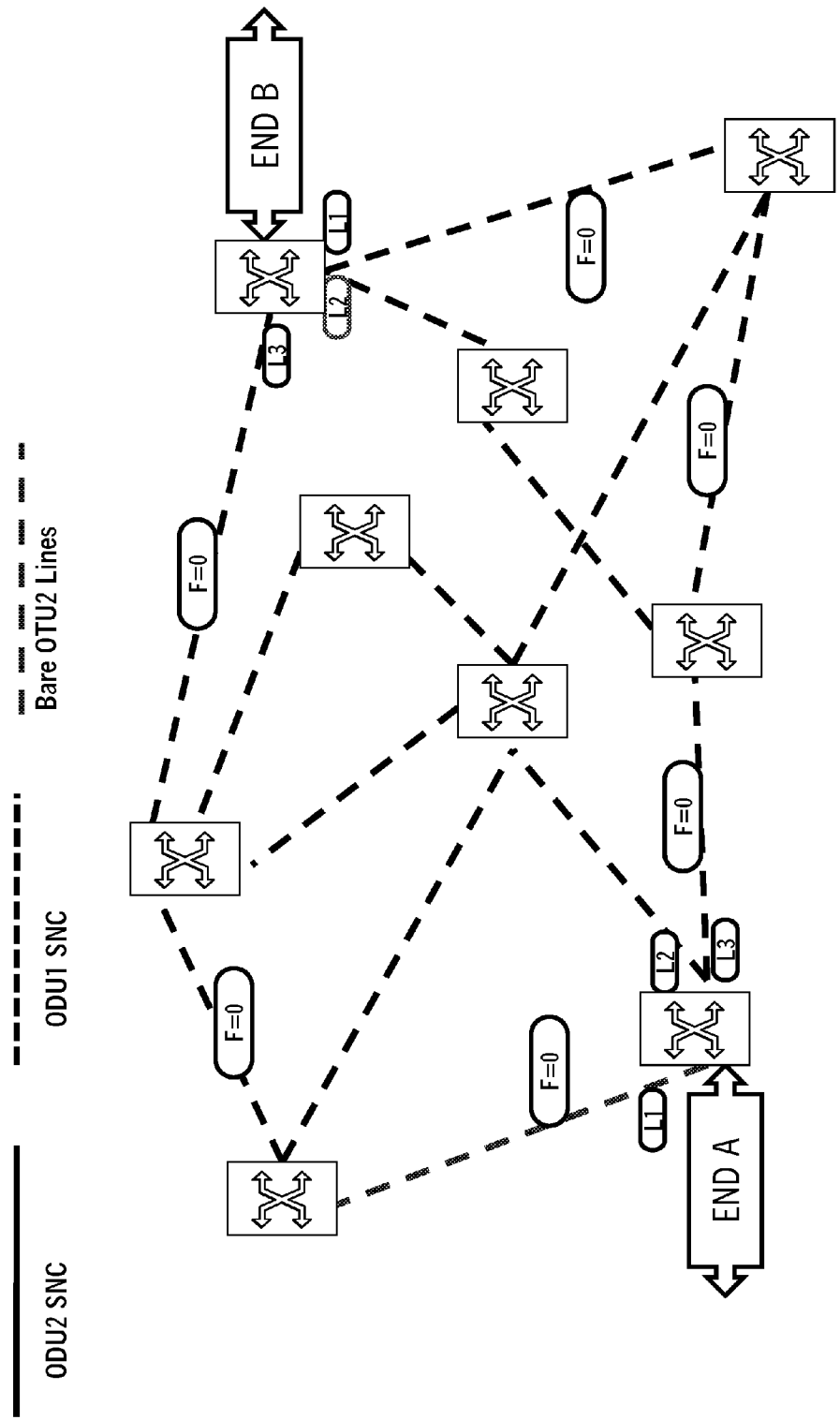
Figure 10:
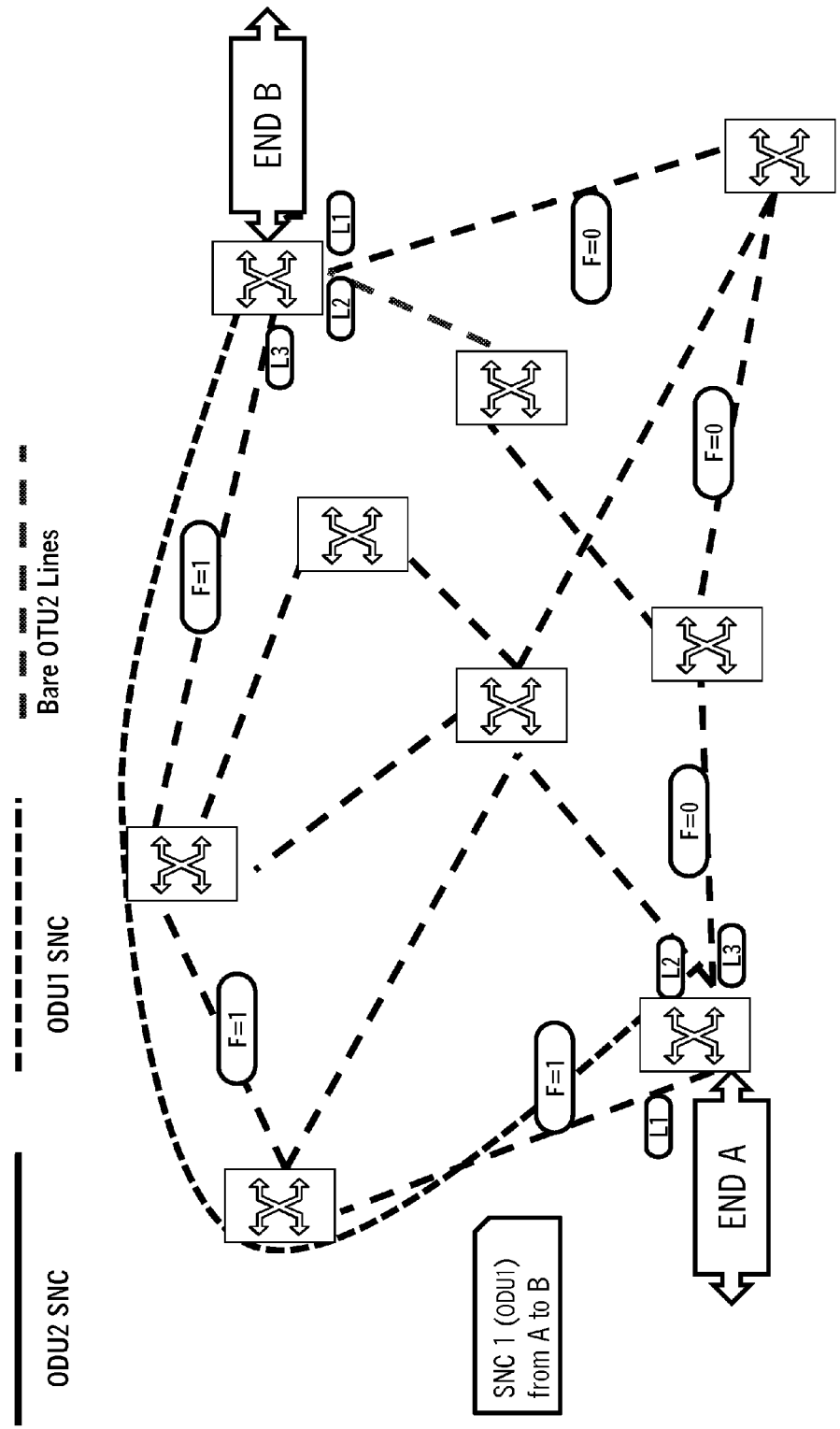

FIGS. 9-12 illustrate bottleneck resolution by considering bandwidth defragmentation where new connections are created. Note FIGS. 9-12 correlate to the previous example illustrated in FIG. 6 but includes bandwidth defragmentation. Similar to FIG. 6, the administrative weight is given the first preference in path selection. In the case of a tie, the most optimum path is chosen having links with a higher fragmentation cost, and if there is still a tie based on fragmentation costs, the links with the lowest link ID maybe chosen. Further, the foregoing FIGS. 9-12 illustrate updating of the fragmentation costs as the bandwidth of the links change. FIG. 9 illustrates the network with no provisioned SNCs and the SNCs are created in the same order as in FIG. 6, but this time links are chosen based on the fragmentation cost thereby avoiding the bottleneck for the ODU2 SNC in FIG. 6. Note, initially in FIG. 9, the fragmentation costs, F, for each link is zero. In FIG. 10, the first SNC, SNC 1 (ODU1) is added between the ends A, B. Using the path selection algorithm, the SNC 1 will be calculated on the path with the lowest link IDs since all of the links have the same fragmentation costs and the same administrative weights. Now in FIG. 10, the fragmentation costs are updated with the links now provisioned with the SNC 1 having a fragmentation cost, F, equal to one since one ODU1 is now provisioned on these links.

Figure 11:
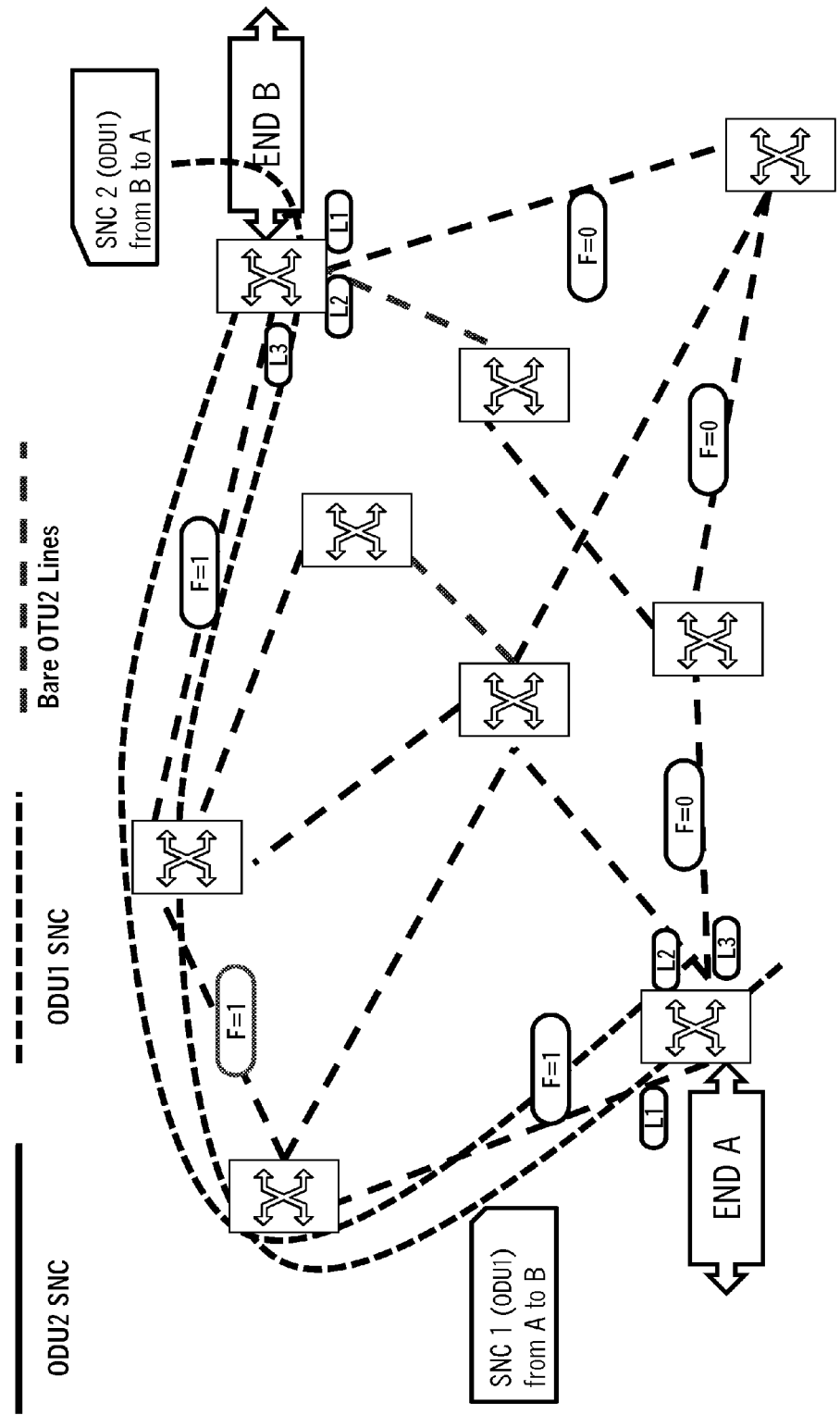
Figure 12:
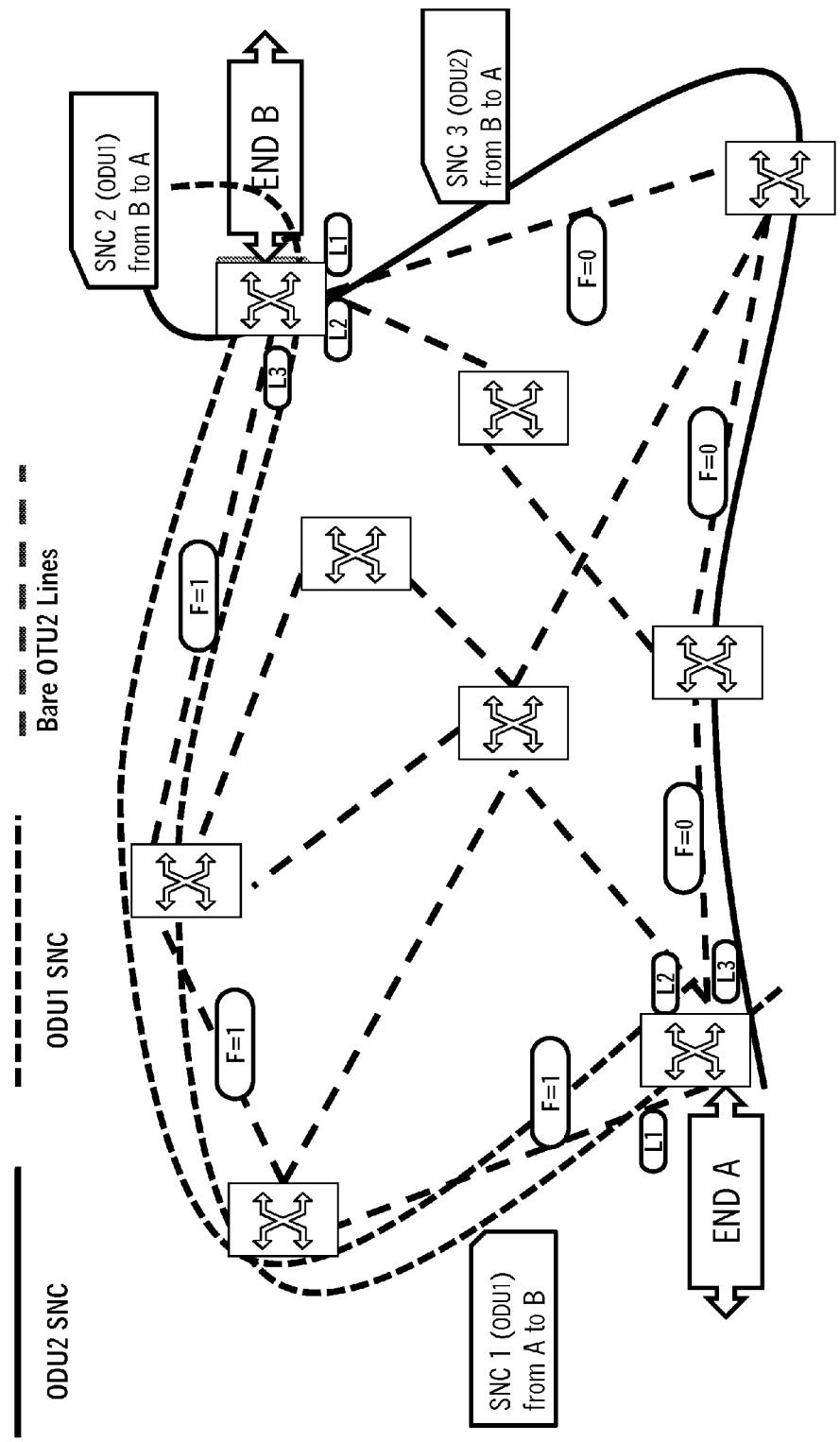

In FIG. 11, the second SNC, SNC 2 (ODU1) is added. Here, the SNC 2 will see the same administrative weights, but instead of selecting a path based on the lowest link ID or some other metric, the SNC 2 will choose fragmented links. As such, the SNC 2 will be provisioned on the same path as the SNC 1. Also, the fragmentation costs, F, do not change for the links from one as adding another ODU1 to these links equates to the same value for the fragmentation costs in the matrix shown herein. In FIG. 12, the ODU2 SNC is provisioned between the ends A, B. Here, the ODU2 SNC 3 is provisioned, and the fragmentation cost, F, on the corresponding links is set to zero as these links are now fully occupied.

Figure 13:
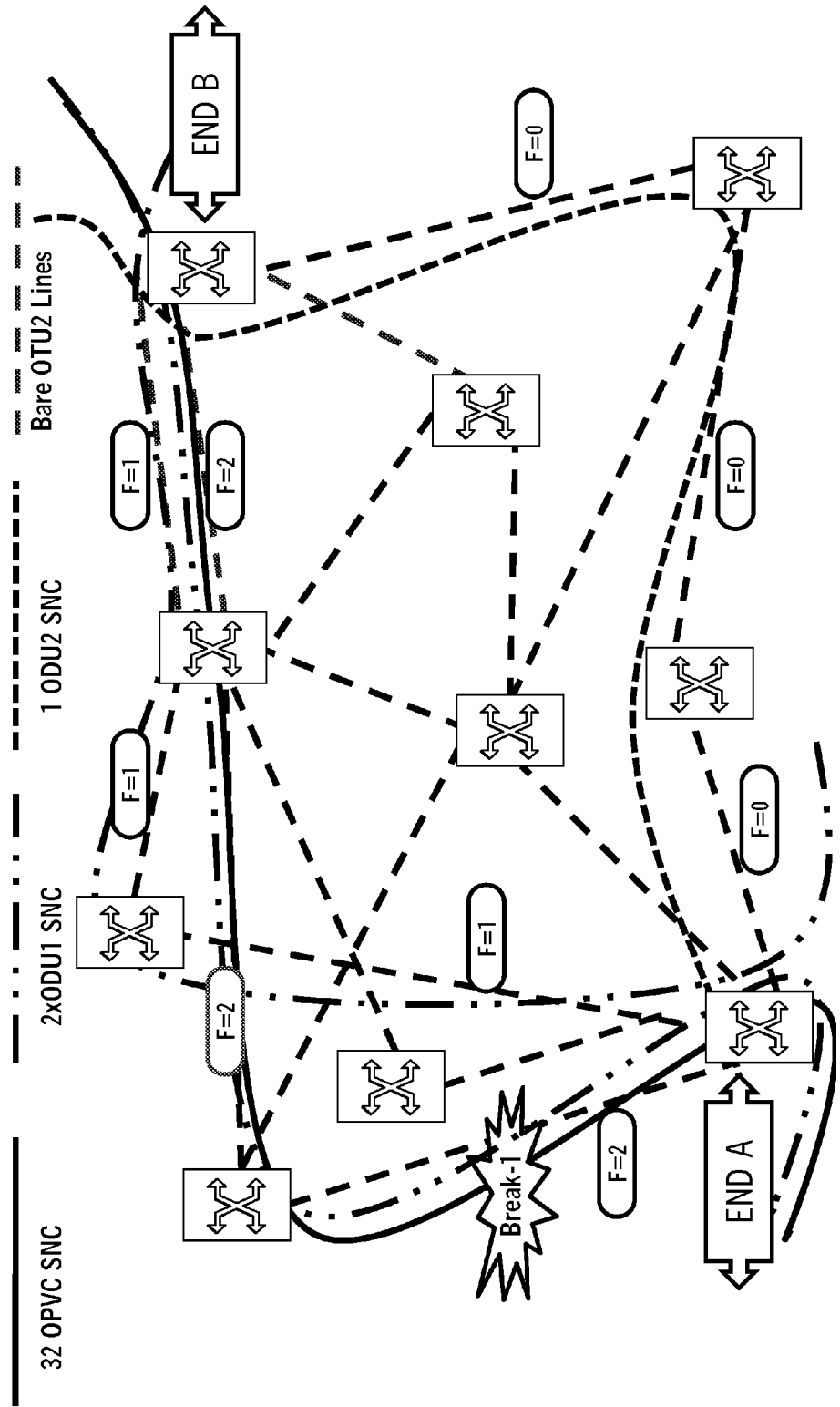
Figure 14:
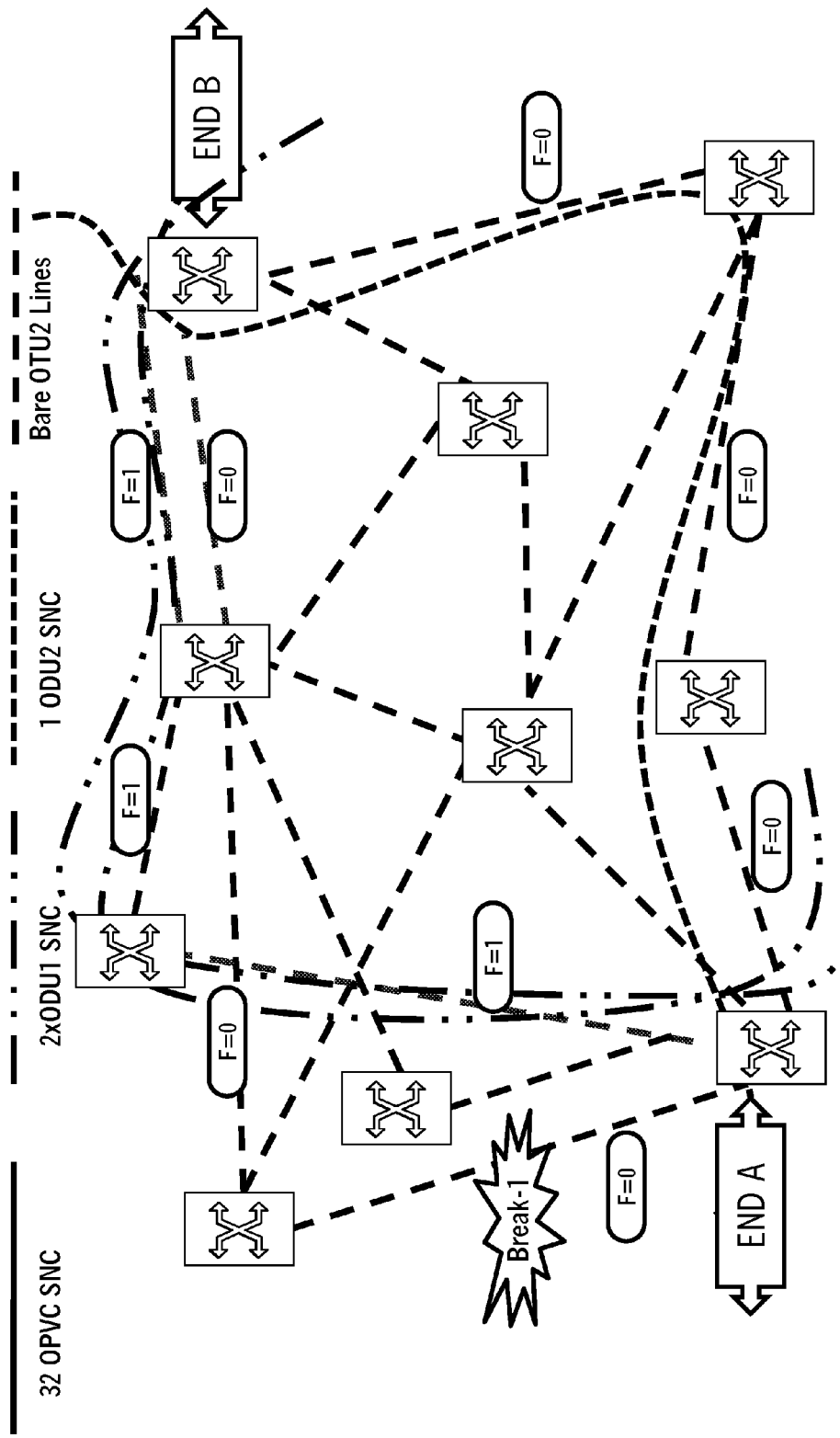
Figure 15:
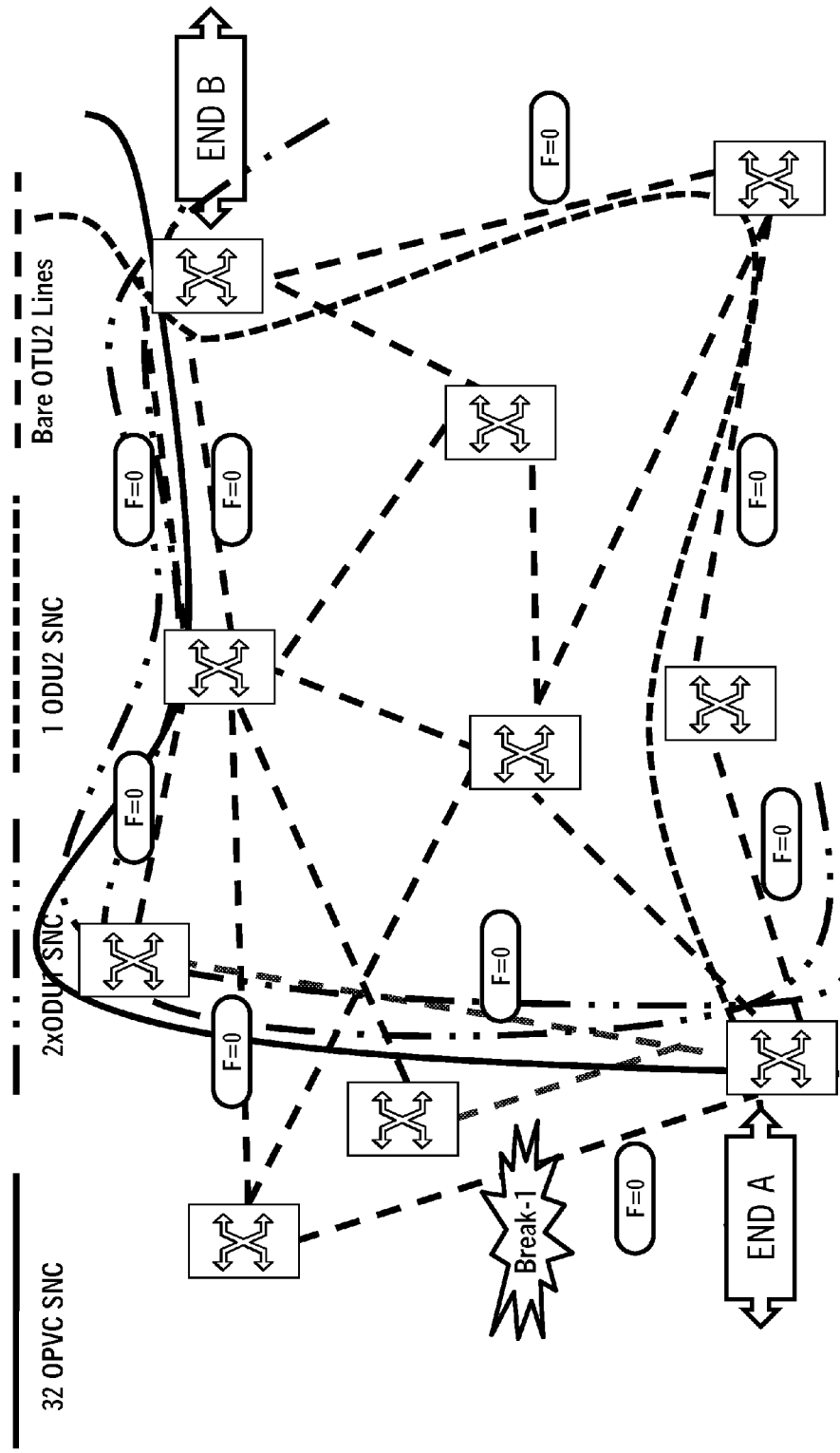
Figure 16:
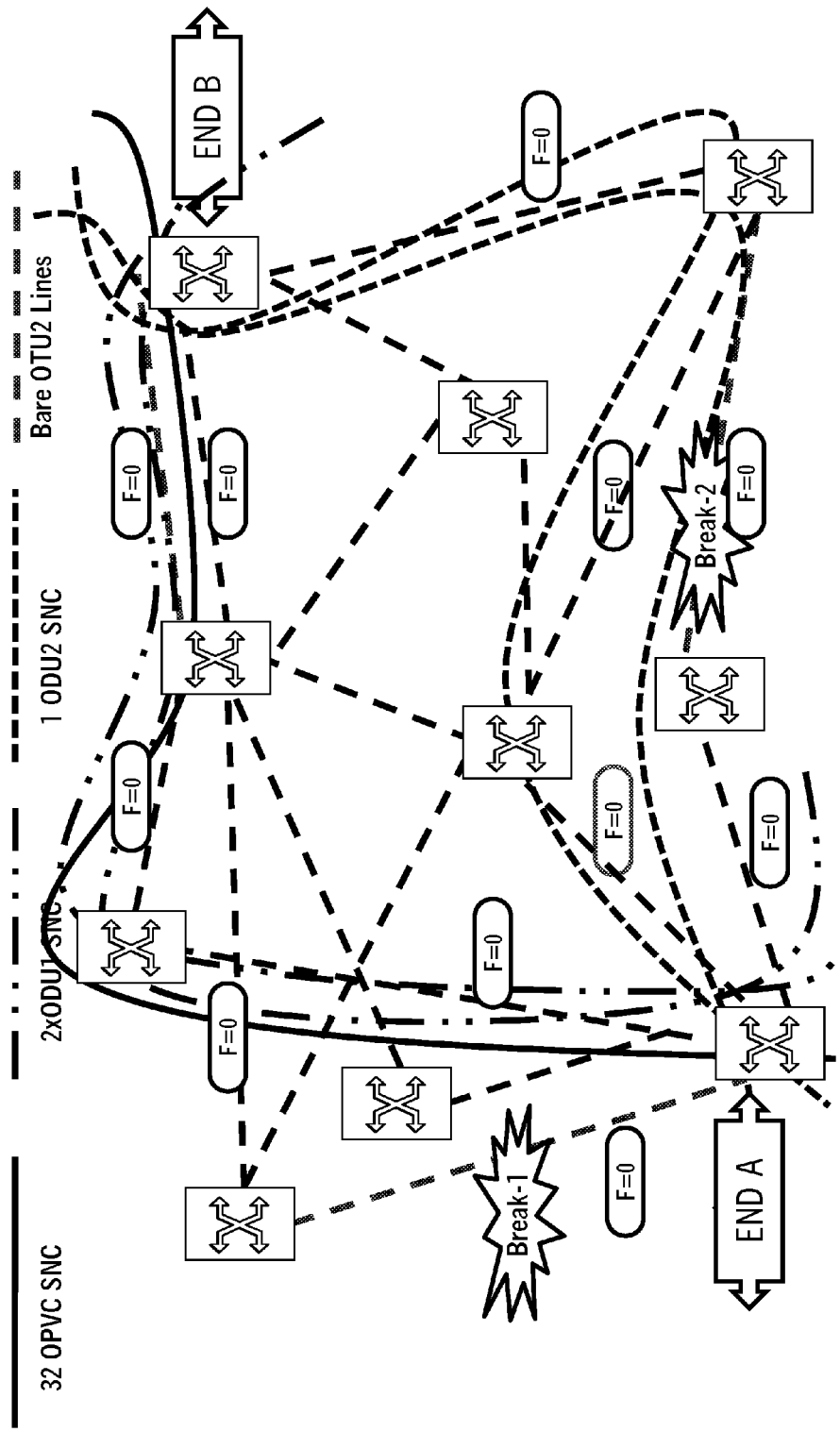

FIGS. 13-16 illustrate the example previously shown in FIGS. 7 and 8 with bandwidth defragmentation consideration instead of the randomization during protect path calculation. FIG. 13 is similar to FIG. 7 showing the network with a current snapshot of connections including 2xODU1, 32xOPVC, and 1xODU2 along with associated fragmentation costs, F, for each link. Also, assume there is a fiber cut denoted as Break-1. In FIG. 14, the 2xODU1 SNCs are mesh restored to the already fragmented link as shown, and the link with the Break-1 is set to a fragmentation cost of zero. In FIG. 15, the 32xOPVC SNC follows the same trend choosing the same path as the 2xODU1 SNCs based on the fragmentation cost, and the fragmentation cost of this path is now changed to zero. In FIG. 16, the 1xODU2 SNC now has a protect path due to the use of fragmentation cost in mesh restoration. Thus, upon a fiber cut, Break-2, the 1xODU2 SNC may mesh restore.

As described herein, this idea of a fragmentation cost deduced locally at each node and used in the end to end path computation is a unique approach to avoid bandwidth fragmentation. The present invention may work under any value of link administrative weight and topology and provide an end-to-end de-fragmented path for connections. The present invention addresses the issue of bandwidth fragmentation by using the bandwidth advertised through the routing protocol.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:
1. A network, comprising:
a plurality of nodes;
a plurality of links interconnecting the plurality of nodes, wherein the plurality of links comprise a bandwidth hierarchy;
a signaling and routing protocol operated between the plurality of nodes and configured to establish bandwidth connections over the plurality of links between the plurality of nodes; and
a bandwidth defragmentation algorithm utilized within the signaling and routing protocol to optimize the bandwidth hierarchy on the plurality of links;
wherein the bandwidth defragmentation algorithm utilizes and compares a relative fragmentation cost metric for each of the plurality of links after an administrative weight for each of the plurality of links has been utilized and compared by a path selection algorithm; and
wherein the relative fragmentation cost metric quantifies bandwidth fragmentation for each of the plurality of links on a weighted per link basis.

2. The network of claim 1, wherein the bandwidth defragmentation algorithm comprises assigning the relative fragmentation cost metric to each of the plurality of links based upon provisioned bandwidth in the bandwidth hierarchy.

3. The network of claim 2, wherein the relative fragmentation cost metric for each of the plurality of links is calculated and stored locally at each of the plurality of nodes based upon advertisements from the signaling and routing protocol.

4. The network of claim 2, wherein the bandwidth defragmentation algorithm comprises selecting a path through the plurality of links and the plurality of nodes based upon the relative fragmentation cost metric for each of the plurality of links.

5. The network of claim 4, wherein the bandwidth defragmentation algorithm is utilized only if there is a tie in the path selection algorithm based upon the administrative weights of the plurality of links.

6. The network of claim 2, wherein the plurality of nodes and the plurality of links utilize Optical Transport Network and the bandwidth hierarchy comprises any of Optical Channel Data Unit-n (n=0, 1, 2, 3, . . . ) and Optical channel Payload Virtual Containers, and wherein the relative fragmentation cost metric is a different value for each of the bandwidth hierarchy.

7. The network of claim 2, wherein the plurality of nodes and the plurality of links utilize Synchronous Optical Network and the bandwidth hierarchy comprises any of Synchronous Transport Signal—k (k=1, 3, 12, 24, 48, 192, . . . ), and wherein the relative fragmentation cost metric is a different value for each of the bandwidth hierarchy.

8. The network of claim 2, wherein the plurality of nodes and the plurality of links utilize Synchronous Digital Hierarchy and the bandwidth hierarchy comprises any of Synchronous Transport Module level n (n=1, 4, 16, 64, 256, . . . ), and wherein the relative fragmentation cost metric is a different value for each of the bandwidth hierarchy.

9. The network of claim 2, wherein the signaling and routing protocol comprises any of Optical Signaling and Routing Protocol (OSRP), Automatically Switched Optical Networks—ITU-T Recommendation G.8080: Architecture for the Automatically Switched Optical Network (ASON) 2001, Generalized Multi-Protocol Label Switching Architecture (G-MPLS) IETF RFC 3945, 2004, and Private Network-Network Interface (PNNI).

10. The network of claim 2, wherein each of the plurality of nodes comprises a control module communicatively coupled to corresponding control modules of other of the plurality of nodes via an in-band or an out-of-band communication mechanism, and wherein the control module is configured to implement the signaling and routing protocol and the bandwidth defragmentation algorithm.

11. The network of claim 3, wherein the relative fragmentation cost metric for each of the plurality of links is dynamically calculated and stored locally at each of the plurality of nodes based upon advertisements from the signaling and routing protocol and based upon updates received via the advertisements.

12. The network of claim 3, wherein the relative fragmentation cost metric is based upon a predefined matrix for the bandwidth hierarchy, and the predefined matrix is established for Optical Transport Network, Synchronous Optical Network, and Synchronous Digital Hierarchy.

13. A network element, comprising:
one or more line modules comprising ingress and egress to a plurality of links in a network;
a control module communicatively coupled to the one or more line modules, wherein the control module is configured to operate a signaling and routing protocol to establish bandwidth connections via the one or more line modules over the plurality of links, and wherein the control module is configured to:
maintain a fragmentation cost of all links in the network;
responsive to a bandwidth request, determine a path through the network for the bandwidth request based upon a path selection algorithm; and
utilize the fragmentation cost subsequent to the path selection algorithm based upon a bandwidth defragmentation algorithm;
wherein the fragmentation cost quantifies bandwidth fragmentation for the plurality of links on a weighted per link basis.

14. The network element of claim 13, wherein to maintain the fragmentation cost comprises assigning a relative fragmentation cost metric to each of the links in the network based upon provisioned bandwidth in a bandwidth hierarchy, and wherein to maintain the fragmentation cost comprises dynamically maintaining the relative metric based upon advertisements from the signaling and routing protocol.

15. The network element of claim 14, wherein the path selection algorithm comprises selecting a path through the links in the network based upon administrative weight and the bandwidth defragmentation algorithm comprises selecting a path through the links in the network based upon the relative fragmentation cost metric, and wherein the relative fragmentation cost metric is utilized only if there is a tie in the path selection algorithm based upon the administrative weight of the links.

16. The network element of claim 13, wherein the relative fragmentation cost metric is based upon a predefined matrix for the bandwidth hierarchy, and the predefined matrix is established for Optical Transport Network, Synchronous Optical Network, and Synchronous Digital Hierarchy.

17. A network operating method with bandwidth defragmentation, comprising:
operating a plurality of nodes interconnected by a plurality of links with a signaling and routing protocol;
maintaining a relative fragmentation cost metric for each of the plurality of links, wherein the relative metric defines fragmentation on each of the plurality of links based upon a bandwidth hierarchy;
selecting a path for a bandwidth connection based upon parameters associated with the plurality of links including the relative fragmentation cost metric; and
updating the relative fragmentation cost metric for each of the plurality of links based upon the selected path for the bandwidth connection;
wherein the relative fragmentation cost metric for each of the plurality of links is utilized and compared after an administrative weight for each of the plurality of links has been utilized and compared; and
wherein the relative fragmentation cost metric quantifies bandwidth fragmentation for each of the plurality of links on a weighted per link basis.

18. The network operating method of claim 17, further comprising:
during path selection, having two or more paths with equal administrative weights and selecting one of the two or more paths based upon the relative fragmentation cost metric defining fragmentation.

19. The network operating method of claim 17, further comprising:
providing advertisements through the signaling and routing protocol; and locally updating at each of the plurality of nodes the relative fragmentation cost metric for each of the plurality of links based upon the advertisements.

20. The network operating method of claim 17, further comprising:
defining the relative fragmentation cost metric based upon a bandwidth hierarchy for each of Optical Transport Network, Synchronous Digital Hierarchy, and Synchronous Optical Network.

* * * * *